(12) United States Patent
Bailey et al.

(10) Patent No.: US 8,225,111 B2
(45) Date of Patent: Jul. 17, 2012

(54) METHOD AND APPARATUS TO AUTHENTICATE A POWER SUPPLY

(75) Inventors: Douglas John Bailey, Los Gatos, CA (US); Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 1277 days.

(21) Appl. No.: 11/311,957

(22) Filed: Dec. 19, 2005

(65) Prior Publication Data

US 2007/0143636 A1 Jun. 21, 2007

(51) Int. Cl.
*G06F 21/00* (2006.01)
(52) U.S. Cl. .................. 713/300; 726/34; 380/59
(58) Field of Classification Search ........................ None
See application file for complete search history.

(56) References Cited

U.S. PATENT DOCUMENTS

| | | | |
|---|---|---|---|
| 4,737,657 A | 4/1988 | Jatko et al. | |
| 5,548,200 A | 8/1996 | Nor et al. | |
| 5,592,069 A | 1/1997 | Dias et al. | |
| 5,694,024 A | 12/1997 | Dias et al. | |
| 5,867,006 A | 2/1999 | Dias et al. | |
| 6,018,228 A | 1/2000 | Dias et al. | |
| 6,108,751 A | 8/2000 | Lee et al. | |
| 7,296,164 B2 * | 11/2007 | Breen et al. | 713/300 |
| 7,392,410 B2 * | 6/2008 | Allen et al. | 713/310 |
| 7,506,183 B2 | 3/2009 | Araya | |
| 2003/0102842 A1 | 6/2003 | Tamai et al. | |
| 2004/0003304 A1 | 1/2004 | Kobayashi | |
| 2005/0264772 A1 | 12/2005 | Masukawa | |
| 2006/0080051 A1 * | 4/2006 | Breen et al. | 702/60 |
| 2006/0085658 A1 * | 4/2006 | Allen et al. | 713/310 |
| 2006/0108972 A1 | 5/2006 | Araya | |
| 2007/0089163 A1 | 4/2007 | Denton | |

FOREIGN PATENT DOCUMENTS

| | | |
|---|---|---|
| EP | 0777311 A2 | 6/1997 |
| JP | 04-308415 | 10/1992 |
| JP | 07-143749 | 6/1995 |
| JP | 2001-069757 | 3/2001 |
| JP | 2005-094128 | 4/2005 |
| WO | WO 96/16462 A1 | 5/1996 |
| WO | WO 00/59127 A1 | 10/2000 |
| WO | WO 01/93398 A2 | 12/2001 |

OTHER PUBLICATIONS

European Search Report with Communication, European Patent Application No. 06254827.6; official communication dated Apr. 6, 2009, Search Report dated Mar. 31, 2009.
Dallas Semiconductor Corp./Maxim Integrated Products, Inc., "DS2703 SHA-1 Battery Pack Authentication IC," Product Data Sheet, (Jul. 18, 2005), pp. 1-20.
Dallas Semiconductor Corp./Maxim Integrated Products, Inc., Advertisement for DS2703, 1 page. (Retrieved Dec. 2005).
CN 200610167562.0—Chinese First Office Action, issued Oct. 9, 2009 (11 pages).

(Continued)

*Primary Examiner* — Oscar Louie
(74) *Attorney, Agent, or Firm* — Blakely Sokoloff Taylor & Zafman LLP

(57) ABSTRACT

A power supply that can be authenticated is disclosed. An apparatus according to aspects of the present invention includes an external power supply of an electronic product that modulates an output of the power supply with information encoded to identify the power supply to the product.

26 Claims, 5 Drawing Sheets

OTHER PUBLICATIONS

EP 06 254 827.6—European Office Action, dated Jul. 1, 2010, (5 pages).

CN 200610167562.0—Chinese Rejection with English Translation, issued Jan. 12, 2012 (6 pages).

* cited by examiner

METHOD AND APPARATUS TO AUTHENTICATE A POWER SUPPLY

BACKGROUND OF THE INVENTION

1. Field of the Invention

Embodiments of the invention relate generally to electronic products and, more specifically but not exclusively relate to electronic products that receive power from external switching power supplies.

2. Background Information

An external power supply is one that remains outside the enclosure of the product, such as the ac adapter for a digital camera, or the dc adapter that allows the product to operate from a power outlet of an automobile. These electronic products usually are small portable units, but products not designed for portability also use external power supplies. For example, some models of small desktop computers use rather large external power supplies.

Manufacturers of electronic products often prefer to use external power supplies rather than an internal power supply to power their equipment. The use of an external power supply reduces the physical size and weight of the product. Also, the design of the product is not burdened with the need to provide cooling for a power supply if the power supply can simply be procured to the manufacturer's specification as an external component. Typically, the external power supply will connect to the product with a long cable to allow the product to be located at a convenient distance away from the power supply.

Manufacturers desire to prevent the use of unauthorized or counterfeit external power supplies with their products. The use of a power supply that does not meet the manufacturer's requirements can expose the product or the user to harm. Manufacturers may also desire to receive information regarding the operating conditions of the external power supply as for example the power consumption of the external power supply or any fault condition that may exist within the external power supply. The ability to receive information regarding the operating conditions of the power supply is also desirable in the case of internal power supplies incorporated inside products such as desktop computers and set top boxes. Internal power supplies are enclosed within the product itself as in the case of products such as set top boxes or TVs. In some cases, a power supply may be fully contained within its own separate enclosure, but yet enclosed inside the enclosure of the product such as a desktop computer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for authenticating a power supply are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

As will be discussed, novel examples for authenticating a power supply are disclosed herein. In one example, a power supply is authenticated using one-way communication from a power supply to an electronic product with no more than two conductors between the power supply and the electronic product in accordance with the teachings of the present invention. Information is encoded on a power supply output and not on a separate data line. The product decodes the information to identify and/or authenticate the power supply and to respond accordingly. The product may refuse to operate with a power supply that it cannot authenticate. The product may also change its mode of operation in response to information that it receives from the power supply. For example, the product may perform different power management operations depending on the capability of the power supply or in response to a fault condition within the power supply.

Figure 1:
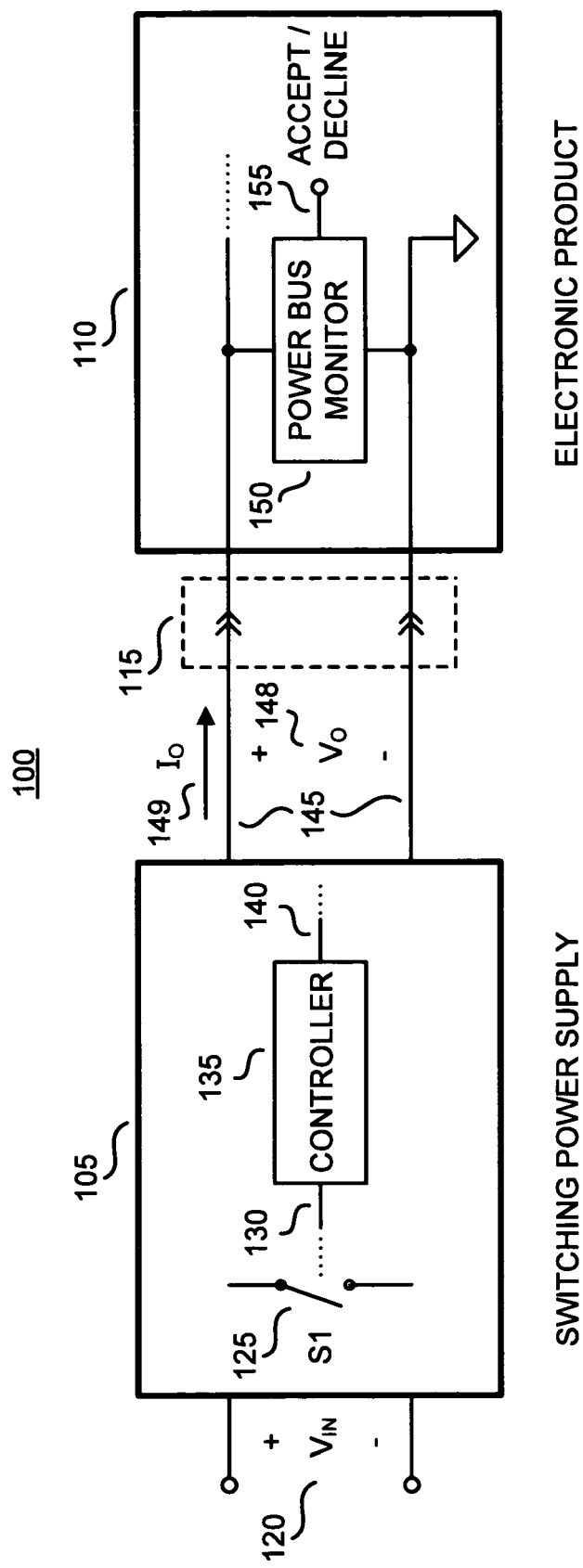
FIG. 1 is a block diagram illustrating an example electronic system with an external power supply in accordance with the teachings of the present invention.

To illustrate, FIG. 1 shows generally an example of an electronic system 100 including an example of an external switching power supply 105 that provides power to an electronic product 110 in accordance with the teachings of the present invention. External switching power supply 105 has an input 120 of voltage $V_{IN}$ and an output 145 of voltage $V_O$ 148 and current $I_O$ 149. External switching power supply 105 includes a switch S1 125 and a controller 135. Controller 135 provides a command signal 130 that switches switch S1 125 in response to an output sense signal 140 to regulate output 145.

Output 145 couples to electronic product 110 through a connector 115. Electronic product 110 contains a power bus monitor 150 that couples to the output 145 of power supply 105 that provides power to electronic product 110 through connector 115. Power bus monitor 150 responds to variations in voltage or variations in current of the output 145 of external switching power supply 105 to produce an authentication signal 155 that indicates whether or not external switching power supply 105 is authorized to provide power to electronic product 110 in accordance with the teachings of the present invention.

Figure 2:
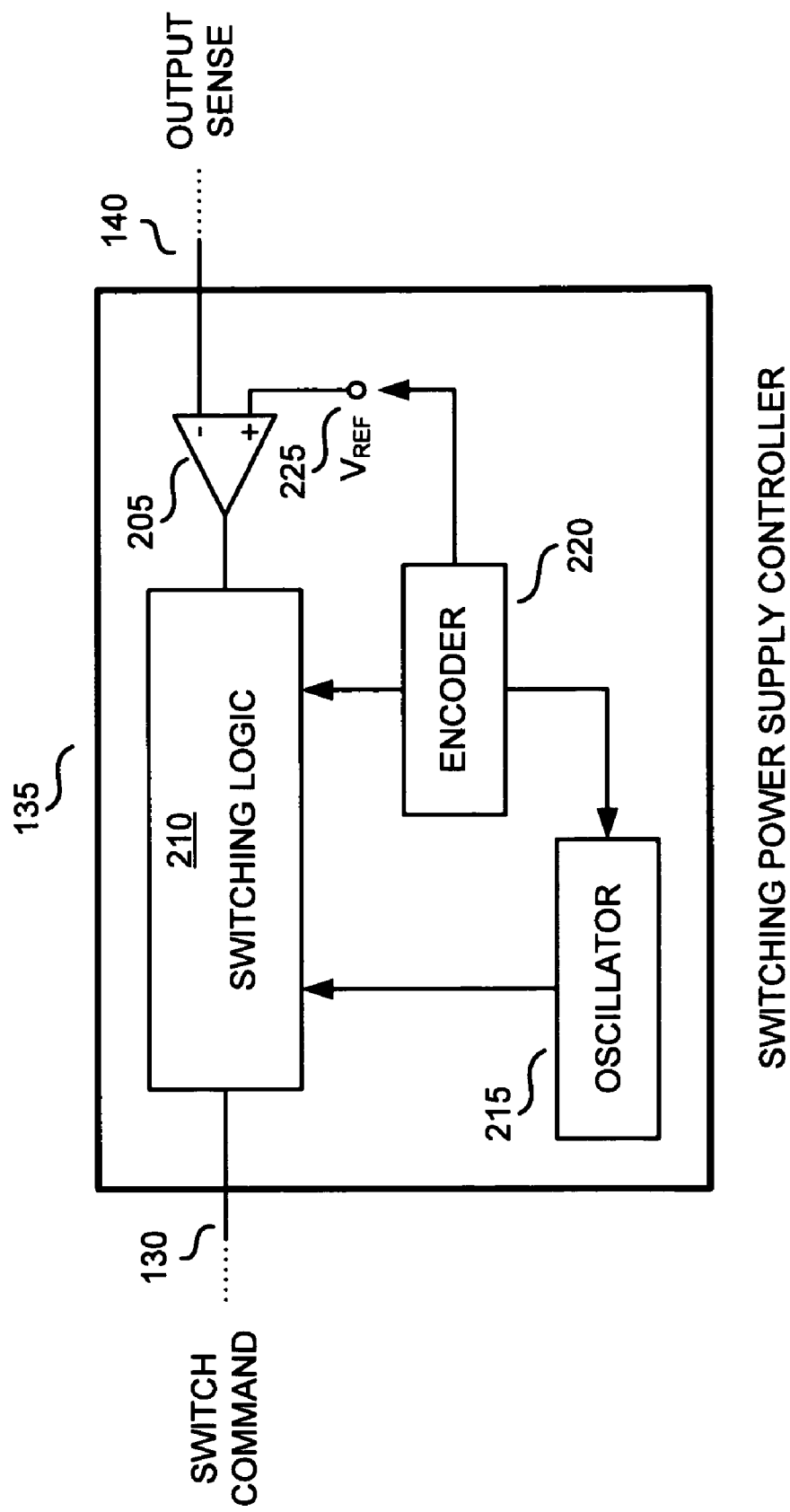
FIG. 2 is a block diagram illustrating an example switching power supply in accordance with the teachings of the present invention.

FIG. 2 shows an example of the switching power supply controller 135 of FIG. 1 in greater detail. As shown, example switching power supply controller 135 contains an oscillator 215, switching logic 210, an encoder 220, and an error amplifier 205 coupled together. Error amplifier 205 receives an output sense signal 140 and a reference signal $V_{REF}$ 225. Switching logic 210 responds to oscillator 215, encoder 220, and error amplifier 205 to produce a switch command signal 130 that switches the switch S1 125 to produce a desired output 145. Encoder 220 may modify the operation of oscillator 215, the value of reference signal 225, and the response of switching logic 220 in a prescribed way to provide information that identifies the power supply to the electronic product in accordance with the teachings of the present invention.

It is appreciated that in the present disclosure, the term "encoding" or "coding" may be interpreted as just the adding of information content to events. Therefore, it is appreciated that the use of the term "encoding" or "coding" as used herein does not necessarily imply the use of encryption to maintain the security or privacy of the information. The information may or may not be encoded with encryption when "encoded" or "coded" in accordance with the teachings of the present invention.

Figure 3:
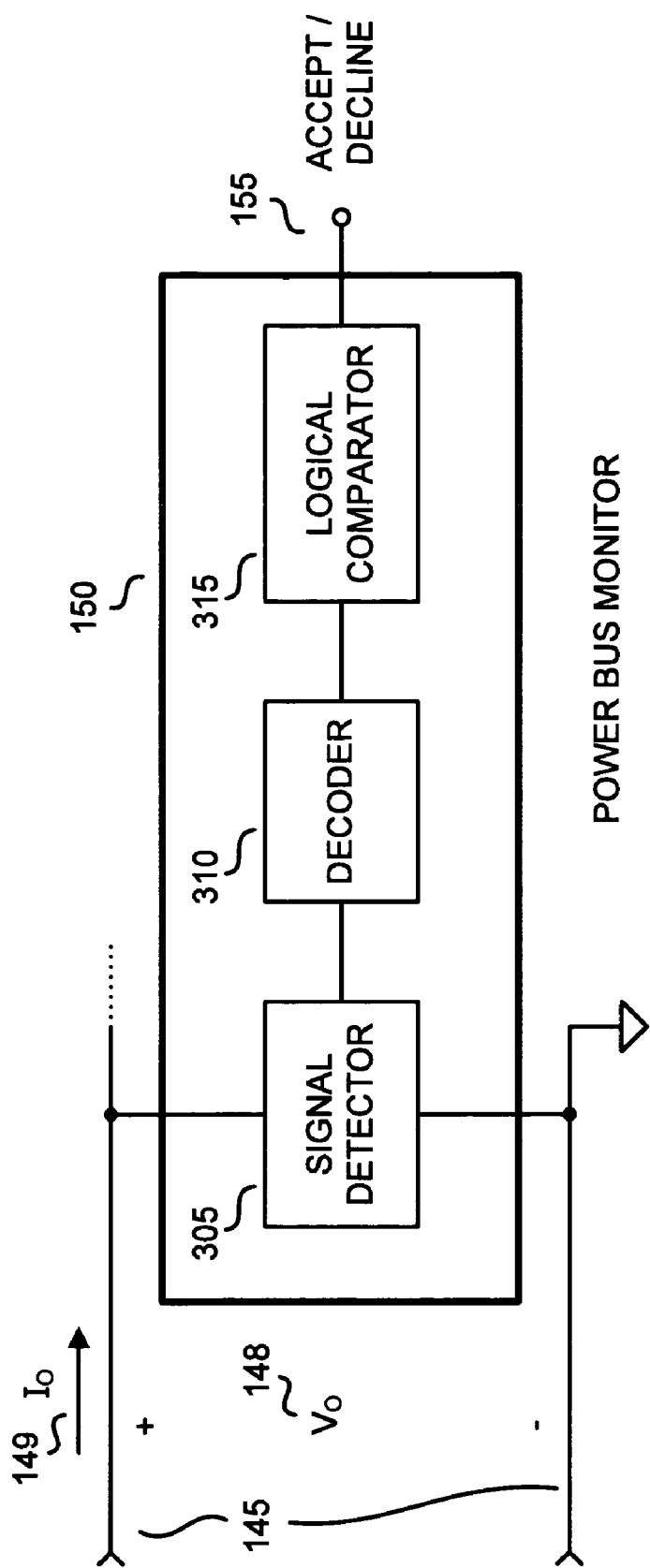
FIG. 3 is a block diagram illustrating an example power bus monitor in accordance with the teachings of the present invention.

FIG. 3 is a block diagram that shows an example of the power bus monitor 150 of FIG. 1 in greater detail. As shown, power bus monitor 150 includes a signal detector 305, a decoder 310, and a logical comparator 315. Signal detector 305 detects patterns of variations in output 145 that are interpreted by decoder 310 and evaluated by logical comparator 315. The nodal connection to the power bus in the example illustrated in FIG. 3 would be used to detect variations in the output voltage 148. It is appreciated that in an alternative example, signal detector 305 could be coupled to detect variations in output current 149. The detected variations in voltage or current could be large such as the presence or absence of a voltage or current, or they could be low amplitude ripples on a much larger dc value of voltage or current. In the illustrated example, logical comparator 315 provides a logic output 155 that indicates whether or not an authorized power supply is providing power to the product in accordance with the teachings of the present invention.

Information may be coded on the output of the switching power supply in several ways. The output of a switching power supply contains a low amplitude ripple component at the switching frequency of switch S1 125. In one example, the switching power supply controller 135 changes the switching frequency in a prescribed pattern to encode information on the output of the power supply while keeping the output within its specified range in accordance with the teachings of the present invention.

In one example, the switching frequency may be modulated to reduce the average switching noise, as in jittering the switching frequency to reduce electromagnetic interference. Modulation of the switching frequency typically does not change the regulated value of the output, and the modulation is detectable only as a variation in the small amplitude ripple and noise that is present in the output. The switching frequency is usually modulated at a constant periodic rate between two values. However, in one example, the frequency is modulated in a pattern that represents binary information to identify the power supply for authentication in accordance with the teachings of the present invention.

Figure 4:
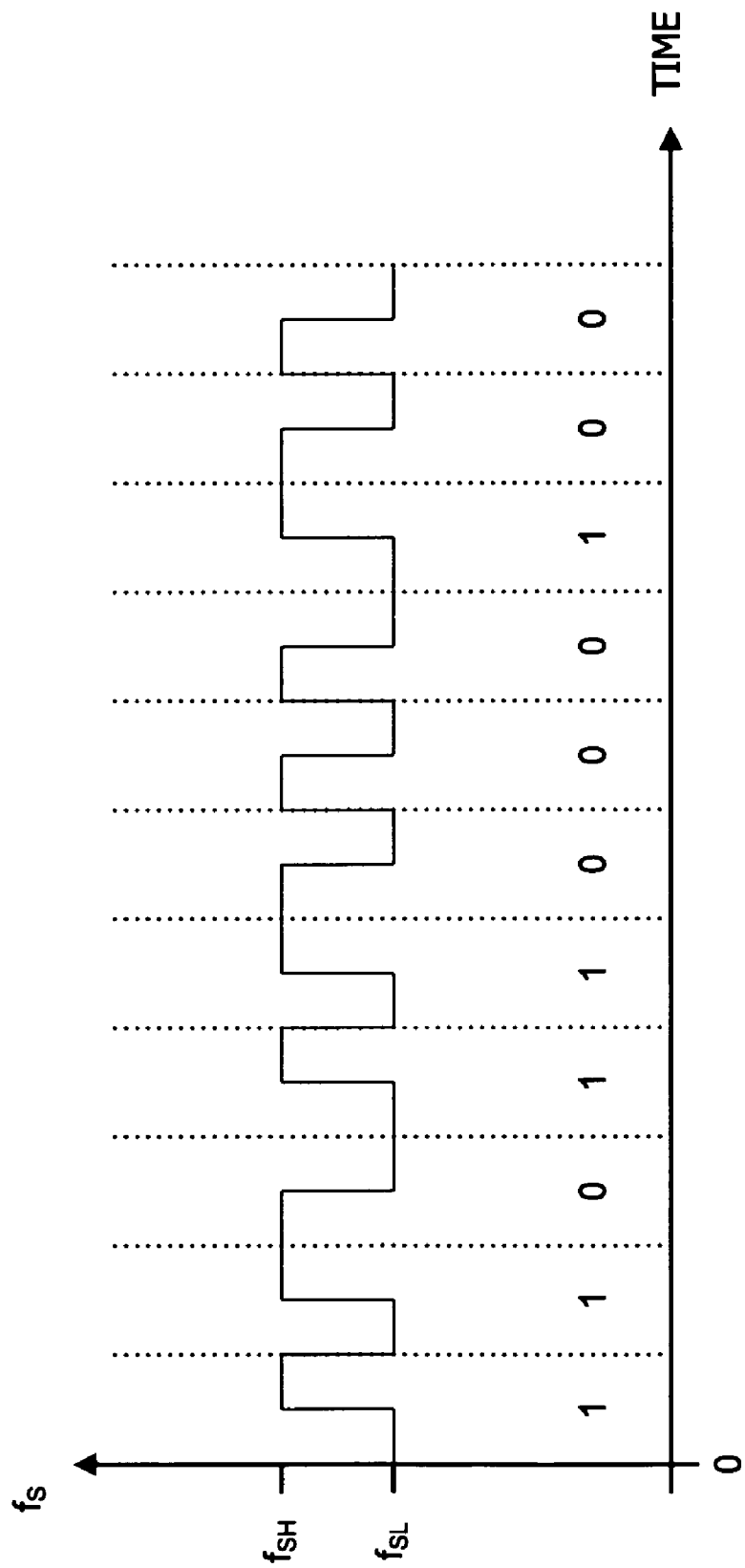
FIG. 4 is a diagram illustrating an example of how a switching frequency can be modulated with encoded information in accordance with the teachings of the present invention.

To illustrate, FIG. 4 shows one example of how the switching frequency of the switch S1 125 of FIG. 1 can be modulated with encoded information in accordance with the teachings of the present invention. In the illustrated example, the switching frequency is shifted between a first frequency $f_{SL}$ and a second frequency $f_{SH}$ in a pattern that represents a sequence of bits. The shift in switching frequency can be gradual or abrupt. The shift of the frequency needs to be only large enough to be detected reliably according to an example of the present invention.

The encoding illustrated in the example of FIG. 4 will be recognized by one skilled in the art as a Manchester encoding. It is appreciated that the Manchester encoding illustrated in FIG. 4 is only one example of a type of encoding and that other types of encoding data may be employed in accordance with the teachings of the present invention. However, the self-clocking property, ease of generation, and zero average value of Manchester encoded signals make Manchester encoded signals one example of encoding that is well suited for encoding binary information on the output of a switching power supply in accordance with the teachings of the present invention. Thus, referring back to FIG. 1, the cable that connects the external power supply 105 to the electronic product 110 needs no more than two conductors in connector 115. In other words, a third conductor for transferring data or synchronization between external power supply 105 and electronic product 110 is not required in accordance with the teachings of the present invention.

Referring now to FIG. 2 for an example, encoder 220 may include a simple linear feedback shift register that uses a polynomial to generate a sequence of bits that encrypts a binary key in accordance with the teachings of the present invention. In use, the manufacturer of the electronic product may specify the polynomial and the key. Modulation of the switching frequency with the desired information can occur intermittently or continuously in accordance with the teachings of the present invention.

Referring now back to FIG. 3, when the switching power supply modulates the switching frequency to encode data on the output of the power supply, signal detector 305 may use any of several well-known frequency demodulation techniques to extract the binary information from the power bus. In one example, decoder 310 includes a linear feedback shift register that uses the same encrypting polynomial and key to decrypt the sequence of bits. When the logical comparator 315 recognizes the key, logical output 155 is asserted to authenticate the power supply in accordance with the teachings of the present invention.

In another example, it is not necessary to modulate the switching frequency to encode information that identifies a power supply for authentication. For instance, the phase of the ripple at the output can be modulated by delaying the switching of the switch by half a switching cycle. In yet another example where the switching frequency does not change, the information can also be encoded in an output quantity of power supply 105, such as for example the amplitude of an output voltage $V_O$ 148 at output 145 or the amplitude of an output current $I_O$ 149 in accordance with the teachings of the present invention.

Figure 5:
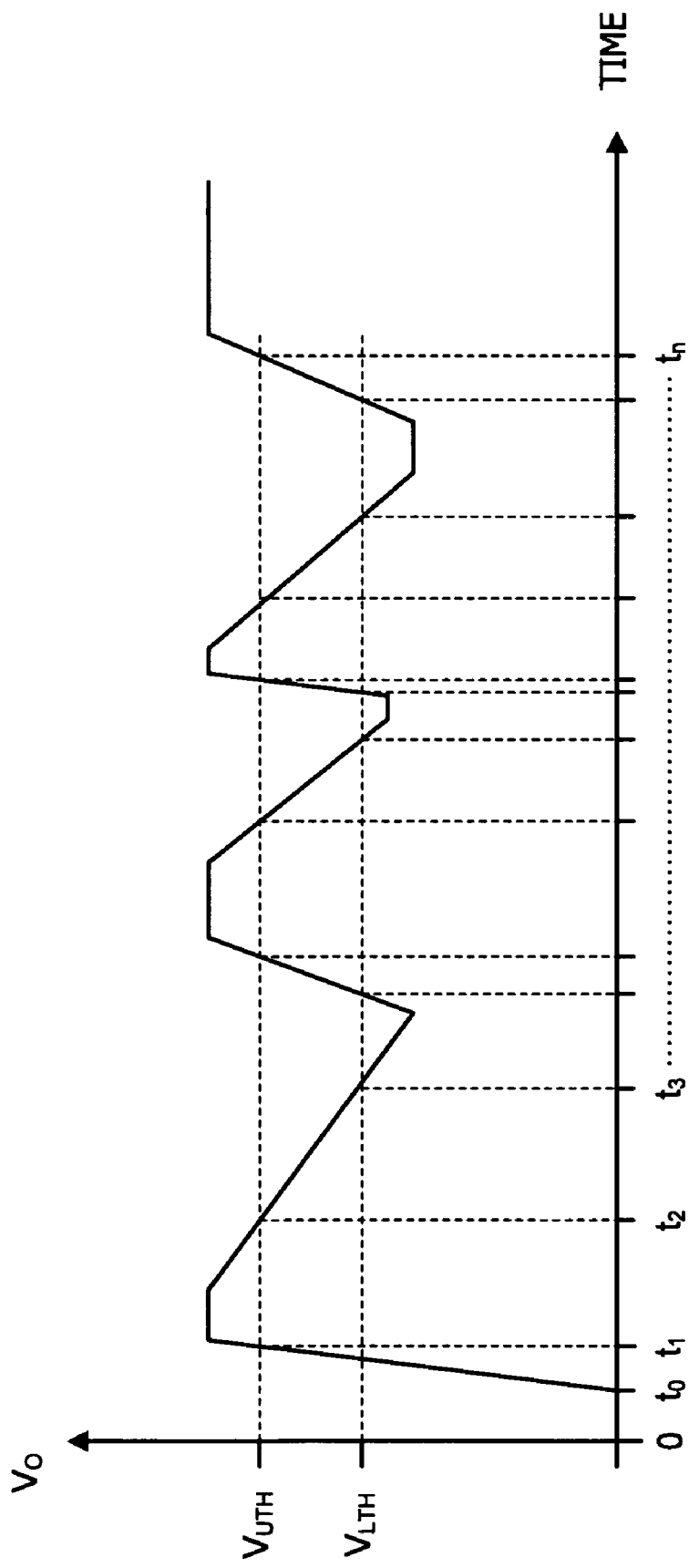
FIG. 5 is a diagram illustrating an example of how an output can be encoded with information to identify a power supply for authentication in accordance with the teachings of the present invention.

To illustrate, FIG. 5 shows one example of how the amplitude of the output voltage $V_O$ 148 of FIG. 1 can be encoded with information to identify a power supply 105 to electronic product 110 for authentication in accordance with the teachings of the present invention. In one example, authentication may occur for example during start-up. In this example of an authentication event during start-up, the output $V_O$ 145 goes through a sequence of changes in amplitude. In one example, a start-up event is the application of alternating current (AC) power to the power supply. In another example, a start-up event is the connection of an output of the power supply to the product. When the authentication is a start-up event, large changes in amplitude typically do not upset the operation of the product 110. Information is encoded at the times that the amplitude crosses thresholds in accordance with the teachings of the present invention. In one example, the duration that an output voltage $V_O$ 148 is above an upper threshold $V_{UTH}$ is compared to the duration the output voltage $V_O$ 148 is below a lower threshold $V_{LTH}$ during an identification event. In one embodiment the lower threshold $V_{LTH}$ is substantially equal to zero volts.

In another example of the present invention, during normal operation, the controller 135 operates using an on/off control scheme where the average frequency at which switch S1 125 switches varies according to the amount of power delivered to the product 110. In this example, the authentication event is an event which takes place when the average frequency at which switch S1 125 switches is within a specific range. While the average switching frequency of S1 of switch S1 125 is within this range, any of the encoding techniques described above can be used such as modulating a magnitude of an output or further modulation of the switching frequency to encode information that can be detected by signal detector 305.

As an example, if the average switching frequency of switch S1 125 is below a threshold value, the encoder 220 of switching power supply controller 135 modulates the reference voltage 225 to modulate the magnitude of the power supply output voltage 140 in accordance with the teachings of the present invention.

As a further example, if the average switching frequency of switch S1 125 is below a threshold value, the encoder 220 of switching power supply controller 135 modulates the oscillator 215 or switching logic 210 to completely disable the switching of switch S1 125 to modulate the magnitude of the power supply output voltage 145 in accordance with the teachings of the present invention.

In a further embodiment of the present invention, during normal operation, the controller 135 receives an output sense signal 140 representative of the output voltage 148. In this embodiment, the authentication event is an event which takes place when the output voltage $V_O$ 148 at output 145 is below a threshold value. While the output voltage is below this threshold value, any of the encoding techniques described above can be used such as modulating a magnitude of an output or modulation of the switching frequency to encode information that can be detected by signal detector 305.

In one example, after signal detector 305 detects an identification event, decoder 310 decodes the sequence and duration of threshold crossings for comparison to a key. In one example, a key is simply the count of a particular number of transitions within a timing window. When logical comparator 315 recognizes the key, logical output 155 is asserted to authenticate the power supply in accordance with the teachings of the present invention.

In addition to simply authenticating an external power supply, any of the above described techniques of encoding and decoding can also be applied to allow the power supply 105 to provide information to the electronic product 110 regarding the operating conditions of the external power supply, for example the power consumption of the external power supply or any fault condition that may exist in the operation of the external power supply. Providing information about the power supply to the electronic product is also desirable when the power supply is internal to the product as for example, in desktop computers, set top boxes, and TVs.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific voltages, currents, frequencies, power range values, times, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An external power supply of an electronic product, comprising:
    a switch coupled to modulate an output of the power supply with information encoded to identify the power supply to the product, wherein the output of the power supply includes no more than two conductors to transfer the information encoded to identify the power supply and to transfer power from the power supply to the product; and
    a controller coupled to provide a command signal to the switch in response to an encoder and a sense signal that senses the output of the power supply, wherein the encoder provides the information to identify the power supply to the electronic product, wherein the controller includes:
        an oscillator, wherein the encoder is coupled to modify the operation of the oscillator;
        an error amplifier coupled to receive a reference signal and the sense signal, wherein the encoder is coupled to modify a value of the reference signal; and
        switching logic that produces the command signal in response to the oscillator, the encoder, and the error amplifier.

2. The external power supply of claim 1 wherein the encoder includes a shift register that uses a polynomial to generate a sequence of bits that encrypts a binary key.

3. The external power supply of claim 2 wherein the shift register is a linear feedback shift register.

4. The external power supply of claim 1 wherein transferring the information encoded to identify the power supply to the product is one-way communication.

5. A system, comprising:
    an external power supply having an external power supply output; and
    an electronic product coupled to the power supply output to receive power from the external power supply, wherein the electronic product includes a power bus monitor coupled to identify the power supply by interpreting information encoded on the external power supply output and coupled to produce an authentication signal that indicates whether or not the power supply is authorized to provide power to the electronic product, wherein the external power supply output includes no more than two conductors to transfer the information encoded on the external power supply output and to transfer power from the external power supply to the electronic product, wherein the power bus monitor includes:
        a signal detector coupled to receive and demodulate the information encoded on the external power supply output into a sequence of bits;

a decoder coupled to receive the sequence of bits from the signal detector and decrypt the sequence of bits; and a logical comparator coupled to receive the sequence of bits decrypted by the decoder, the logical comparator asserting the authentication signal indicating the external power supply is authorized when the logical comparator recognizes the sequence of bits decrypted by the decoder as a key, wherein the decoder includes a linear feedback shift register that uses an encrypting polynomial and the key to decrypt the sequence of bits.

6. A switching power supply, comprising:

a switch coupled to regulate an output of the switching power supply; and a controller coupled to provide a command signal to the switch, the command signal having a switching frequency in response to an encoder and a sense signal that senses the output of the switching power supply, wherein the switching frequency changes in a pattern that identifies the switching power supply to an electronic product to be coupled to receive power from the switching power supply output, wherein the switching power supply output includes no more than two conductors to transfer the pattern that identifies the switching power supply and to transfer the power from the power supply to the electronic product, wherein the encoder provides information to modulate the pattern of the switching frequency to identify the power supply to the electronic product, wherein the controller includes:

an oscillator, wherein the encoder is coupled to modify the operation of the oscillator;

an error amplifier coupled to receive a reference signal and the sense signal, wherein the encoder is coupled to modify a value of the reference signal; and switching logic that produces the command signal in response to the oscillator, the encoder, and the error amplifier.

7. The switching power supply of claim 6 wherein the encoder includes a shift register that uses a polynomial to generate a sequence of bits that encrypts a binary key.

8. The switching power supply of claim 7 wherein the shift register is a linear feedback shift register.

9. A switching power supply, comprising:

a switch coupled to regulate an output of the switching power supply; and a controller coupled to provide a command signal to the switch in response to an encoder and a sense signal that senses the switching power supply output, the switching power supply coupled to change a magnitude of the switching power supply output in a pattern that identifies the switching power supply to an electronic product to be coupled to receive power from the switching power supply output, wherein the switching power supply output includes no more than two conductors to transfer the pattern that identifies the switching power supply and to transfer the power from the power supply to the electronic product, wherein the encoder provides information to change the magnitude of the switching power supply output to identify the power supply to the electronic product, wherein the controller includes:

an oscillator, wherein the encoder is coupled to modify the operation of the oscillator;

an error amplifier coupled to receive a reference signal and the sense signal, wherein the encoder is coupled to modify a value of the reference signal; and switching logic that produces the command signal in response to the oscillator, the encoder, and the error amplifier.

10. The switching power supply of claim 9 wherein the change of the magnitude of the switching power supply output is coupled to occur within a startup interval.

11. The switching power supply of claim 9 wherein the change of the magnitude of the switching power supply output is coupled to occur when an average switching frequency of the switching power supply is within a range of values.

12. The switching power supply of claim 11 wherein the magnitude of an output voltage of the switching power supply output is coupled to be modulated when the average switching frequency of the switching power supply is within the range of values.

13. The switching power supply of claim 12 wherein the magnitude of the output voltage of the switching power supply output is coupled to be modulated between an upper threshold and a lower threshold value when the average switching frequency of the switching power supply is within the range of values.

14. The switching power supply of claim 13 wherein the magnitude of the output voltage of the switching power supply output is coupled to be modulated between the upper threshold and substantially zero volts when the average switching frequency of the switching power supply is within the range of values.

15. The switching power supply of claim 9 wherein the change of the magnitude of the switching power supply output is coupled to occur when an output voltage of the switching power supply output is below a threshold value.

16. The switching power supply of claim 15 wherein the magnitude of an output of the switching power supply output is coupled to be modulated further when the output voltage of the switching power supply output is below the threshold value.

17. The switching power supply of claim 16 wherein the magnitude of an output voltage of the switching power supply output is coupled to be modulated between an upper threshold and a lower threshold value when the output voltage of the switching power supply output is below a threshold value.

18. The switching power supply of claim 17 wherein the magnitude of an output voltage of the switching power supply output is coupled to be modulated between an upper threshold and substantially zero volts when the output voltage of the switching power supply output is below the threshold value.

19. The switching power supply of claim 9 wherein the change of the magnitude of the output of the switching power supply is coupled to occur when an output current of the switching power supply is within a range of values.

20. The switching power supply of claim 9 wherein the change of the magnitude of the output of the switching power supply is coupled to occur when an output voltage of the switching power supply is within a range of values.

21. The switching power supply of claim 9 wherein the switching power supply is coupled to be identified in response to a number of transitions of the switching power supply output within a timing window.

22. The switching power supply of claim 9 wherein the encoder includes a shift register that uses a polynomial to generate a sequence of bits that encrypts a binary key.

23. The switching power supply of claim 22 wherein the shift register is a linear feedback shift register.

24. A power supply of an electronic product comprising:

a switch coupled to modulate an output of the power supply with information encoded to provide information regarding the operation of the power supply, wherein the output of the power supply includes no more than two conductors to transfer the information regarding the operation of the power supply and to transfer power from the power supply to the electronic product; and a controller coupled to provide a command signal to the switch in response to an encoder and a sense signal that senses the output of the power supply, wherein the encoder provides information to change the magnitude of the switching power supply output to identify the power supply to the electronic product, wherein the controller includes:

an oscillator, wherein the encoder is coupled to modify the operation of the oscillator;

an error amplifier coupled to receive a reference signal and the sense signal, wherein the encoder is coupled to modify a value of the reference signal; and switching logic that produces the command signal in response to the oscillator, the encoder, and the error amplifier.

25. The power supply of claim 24 wherein the information encoded on the output of the power supply includes information regarding the power consumption of the power supply.

26. The power supply of claim 24 wherein the information encoded on the output of the power supply includes information regarding a fault condition that exists within the power supply.

* * * * *